(12) United States Patent
Oikawa

(10) Patent No.: US 6,325,125 B1
(45) Date of Patent: Dec. 4, 2001

(54) LAMINATING TAPE AND TO-BE-LAMINATED TAPE, AS WELL AS METHOD AND DEVICE FOR LAMINATING THE LAMINATING TAPE TO THE TO-BE-LAMINATED TAPE

(75) Inventor: Hideki Oikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/440,018

(22) Filed: Nov. 12, 1999

Related U.S. Application Data

(62) Division of application No. 09/088,687, filed on Jun. 1, 1998.

(30) Foreign Application Priority Data

Jun. 3, 1997 (JP) .................................................... 9-160549

(51) Int. Cl.[7] ....................................................... B32B 7/16
(52) U.S. Cl. ........................................... 156/387; 156/577
(58) Field of Search .................................... 156/289, 291, 156/290, 277, 324, 577, 579, 555, 387, 361

(56) References Cited

U.S. PATENT DOCUMENTS

| | | | |
|---|---|---|---|
| 3,802,983 | * | 4/1974 | Epperson et al. ..................... 156/157 |
| 4,419,175 | | 12/1983 | Bradshaw et al. . |
| 5,370,916 | | 12/1994 | Olsen . |
| 5,419,648 | * | 5/1995 | Nagano et al. ....................... 400/208 |

FOREIGN PATENT DOCUMENTS

| | | |
|---|---|---|
| 0299172 | 1/1989 | (EP) . |
| 0322918 | 7/1989 | (EP) . |
| 0484886 | 5/1992 | (EP) . |
| 2235883 | 3/1991 | (GB) . |
| 0531835 | 2/1993 | (JP) . |
| 9226107 | 9/1997 | (JP) . |
| 9113752 | 9/1991 | (WO) . |

* cited by examiner

Primary Examiner—Michael W. Ball
Assistant Examiner—Barbara J. Musser
(74) Attorney, Agent, or Firm—Hogan & Hartson, L.L.P.

(57) ABSTRACT

A laminating tape has an adhesive layer for adhering to a recording surface of a to-be-laminated tape, and is formed to have a substantially identical width to a width of the to-be-laminated tape. The laminating tape has a preliminary laminating portion formed at a leading end thereof, for being preliminarily laminated to the to-be-laminated tape, and a non-adhesive portion having a predetermined length and extending continuously from an trailing end of the preliminary laminating portion, for permitting lateral motion of the laminating tape with respect to the to-be-laminated tape. In another aspect of the invention, a to-be-laminated tape is provided which has a preliminary to-be-laminated portion formed at a leading end thereof for being preliminarily laminated to a leading end of the laminating tape, and an adhesion-refusing portion having a predetermined length and extending continuously from a trailing end of the preliminary to-be-laminated portion, for permitting lateral motion of the to-be-laminated tape with respect to the laminating tape. A method and device for initially laminating the laminating tape to the to-be-laminated tape are also provided.

8 Claims, 9 Drawing Sheets

LAMINATING TAPE AND TO-BE-LAMINATED TAPE, AS WELL AS METHOD AND DEVICE FOR LAMINATING THE LAMINATING TAPE TO THE TO-BE-LAMINATED TAPE

This is a division of application Ser. No. 09/088,687 filed Jun. 1, 1998, which application is hereby incorporated by reference in its entirety.

BACKGROUND OF THE INVENTION

1. Field of the Invention

This invention relates to a laminating tape that is affixed e.g. to a printing tape after printing, for lamination thereto to thereby protect the printed surface of the printing tape, and a to-be-laminated tape, such as the printing tape. The invention further relates to a method and a device for affixing the laminating tape to the to-be-laminated tape.

1. Prior Art

Conventionally, in a sequence of operations or steps for lamination of a laminating tape to a printing tape (to-be-laminated tape), the printing tape is printed as it is fed from a roll thereof, and at the same time the laminating tape is guided such that the laminating tape meets the printed tape at a confluence as the tapes are fed. At the confluence, the laminating tape and the printed printing tape are brought into contact with each other under pressure. In this case, the printing tape and the laminating tape, which are fabricated so that they have identical widths, are guided by a tape guide provided at the confluence. The guide is designed to prevent the two tapes from being laterally displaced from each other. However, to obtain a properly laminated tape, it is not only required to set up the tape guide accurately, but also to affix leading ends of the two tapes such that lateral sides thereof are accurately aligned with each other during the initial stage of the lamination. As shown in FIG. 1, if the leading ends of two tapes Tp, Tr are not initially affixed to each other without the slightest angular displacement at the start of lamination, the displacement increases as the lamination proceeds causing wrinkling and jamming of the tapes. The laminating tape is highly adhesive and flaccid. Therefore, the alignment operation for the initial lamination process cannot be easily automated, rather, it has conventionally been carried out manually.

However, using the conventional method for beginning the lamination process in which the printing tape and the laminating tape are aligned and affixed to each other manually makes the operation troublesome and it demands skill. This is true even when a jig for positioning the two tapes is used to assist in the alignment. Hence, the conventional method results in a degraded yield of the product (the printing tape having the laminating tape initially laminated thereto).

SUMMARY OF THE INVENTION

It is a first object of the invention to provide a laminating tape which can be initially laminated to a to-be-laminated tape with ease and accuracy without skill.

It is a second object of the invention to provide a to-be-laminated tape which can be initially laminated to a laminating tape with ease and accuracy without skill.

It is a third object of the invention to provide a method of initially laminating a laminating tape to a to-be-laminated tape with ease and accuracy.

It is a fourth object of the invention to provide a device which is capable of initially laminating a laminating tape to a to-be-laminated tape with ease and accuracy.

To attain the first object, according to a first aspect of the invention, there is provided a laminating tape that has an adhesive layer for affixing the laminating tape to a recording surface of a to-be-laminated tape, and is formed to have a substantially identical width to a width of the to-be-laminated tape.

The laminating tape according to the first aspect of the invention is characterized by comprising:

a preliminary laminating portion formed at a leading end of the laminating tape, for being preliminarily laminated to a leading end of the to-be-laminated tape; and a non-adhesive portion having a predetermined length and extending continuously from a trailing end of the preliminary laminating portion, for permitting lateral motion of the laminating tape with respect to the to-be-laminated tape.

According to this laminating tape, the preliminary laminating portion is formed at a leading end thereof, for being preliminarily laminated to the leading end of the to-be-laminated tape, and the non-adhesive portion extends continuously from the trailing end of the preliminary laminating portion. Therefore, the initial lamination of the laminating tape to the to-be-laminate tape is carried out by first placing the preliminary laminating portion of the laminating tape and the leading end of the to-be-laminated tape one upon the other while aligning them to thereby affix them to each other. Then, the lamination is continued from the laminated portion of the tapes through the non-adhesive portion of the laminating tape and a corresponding portion of the to-be-laminated tape while correcting the alignment of the tapes, up to a main laminating portion of the laminating tape extending continuously from the trailing end of the non-adhesive portion and a corresponding portion of the to-be-laminated tape. Since the non-adhesive portion can be moved laterally on the to-be-laminated tape, it is possible to eliminate lateral displacement of the laminating tape with respect to the to-be-laminated tape which can occur at an initial stage of the initial lamination, i.e. at the preliminary laminating portion of the laminating tape, to thereby correct the alignment of the two tapes. This makes it possible to accurately laminate the main laminating portion of the laminating tape to the corresponding portion of the to-be-laminated tape without any displacement. To obtain a desirable laminating condition, it is preferred that the laminating tape is slightly smaller in width than the to-be-laminated tape.

Preferably, the non-adhesive portion is formed by omitting a portion of the adhesive layer.

According to this preferred embodiment, it is possible to form the non-adhesive portion easily by providing the adhesive layer on an entire surface of the laminating tape except the portion for the non-adhesive portion, or by partially eliminating a portion of the adhesive layer provided on the entire surface of the laminating tape.

Alternatively, the non-adhesive portion comprises a tape strip affixed to the adhesive layer, for permitting lateral motion of the laminating tape with respect to the to-be-laminated tape.

According to this preferred embodiment, it is possible to form the non-adhesive portion by simply affixing the tape strip to the adhesive layer of the laminating tape. Since this tape strip increases rigidity, of the non-adhesive portion, not only the non-adhesive portion but also the preliminary laminating portion and the main laminating portion continuously extending from the non-adhesive portion are stretched, which makes it possible to easily and smoothly carry out the sequence of laminating operations including the correction of alignment of the tapes.

Preferably, the tape strip is different in color from a ground color of the to-be-laminated tape.

According to this preferred embodiment, the operator can visually clearly recognize the non-adhesive portion by the color of the strip, so that it is possible to smoothly carry out the sequence of laminating operations including the correction of alignment of the tapes. Further, when the preliminary laminating portion and the non-adhesive portion are finally cut off as unnecessary portions for the laminated tape, the operator can make use of the difference in color between the non-adhesive portion and the to-be-laminated tape as a mark indicative of a cutting position of the laminated tape.

To attain the second object, according to a second aspect of the invention, there is provided a to-be-laminated tape that has a recording surface to which is affixed a laminating tape having an adhesive layer, and is formed to have a substantially identical width to a width of the laminating tape.

The to-be-laminated tape according to the second aspect of the invention is characterized by comprising:

a preliminary to-be-laminated portion formed at a leading end of the to-be-laminated tape, for being preliminarily laminated to a leading end of the laminating tape; and an adhesion-refusing portion having a predetermined length and extending continuously from a trailing end of the preliminary to-be-laminated portion, for permitting lateral motion of the to-be-laminated tape with respect to the laminating tape.

According to this to-be-laminated tape, the preliminary to-be-laminated portion is provided at the leading end thereof for being preliminarily laminated to the leading end of the laminating tape, and the adhesion-refusing portion extends continuously from the preliminary to-be-laminated portion. Therefore, the initial lamination of the laminating tape to the to-be-laminated tape is carried out by first placing the leading end of the preliminary laminating portion and the leading end of the to-be-laminated tape one upon the other while aligning them to thereby affix them to each other. Then, the lamination is continued from the laminated portion of the tapes, through the adhesion-refusing portion of the to-be-laminated tape and a corresponding portion of the laminating tape while correcting the alignment of the tapes, up to a main to-be-laminated portion of the to-be-laminated tape extending continuously from the trailing end of the adhesion-refusing portion and a corresponding portion of the laminating tape. Since the adhesion-refusing portion of the to-be-laminated tape can be moved laterally on the laminating tape, it is possible to eliminate lateral displacement of the to-be-laminated tape with respect to the laminating tape which can occur at an initial stage of the initial lamination, i.e. at the preliminary to-be-laminated portion of the to-be-laminated tape, to thereby correct the alignment of the two tapes. This makes it possible to accurately laminate the main to-be-laminated portion of the to-be-laminated tape to the corresponding part of the laminating tape without any displacement.

Preferably, the adhesion-refusing portion comprises a fluorine coating formed on the recording surface.

According to this preferred embodiment, it is possible to form the adhesion-refusing portion easily by fluorine coating process.

More preferably, the to-be-laminated tape includes a base tape having the recording surface formed thereon, and the fluorine coating layer is different in color from a ground color of the base tape.

According to this preferred embodiment, the operator can visually clearly recognize the adhesion-refusing portion, so that it is possible to smoothly carry out the sequence of laminating operations including the correction of alignment of the tapes. Further, when the preliminary to-be-laminated portion and the adhesion-refusing portion are finally cut off as unnecessary portions for the laminated tape, the operator can make use of the difference in color between the adhesion-refusing portion and the main laminating portion of the to-be-laminated tape as a mark indicative of a cutting position of the laminated tape.

Further preferably, the to-be-laminated tape further includes an adhesive layer formed on an opposite side of the base tape to the recording surface, and a release paper tape laminated to the adhesive layer.

To attain the third object, according to a third aspect of the invention, there is provided a method of laminating a laminating tape to a to-be-laminated tape having a substantially identical width to a width of the laminating tape, the laminating tape having a preliminary laminating portion formed at a leading end thereof, and a non-adhesive portion extending continuously from a trailing end of the preliminary laminating portion, for permitting lateral motion of the laminating tape with respect to the to-be-laminated tape.

The method according to the third aspect of the invention is characterized by comprising the steps of:

placing the leading end of the laminating tape and a leading end of the to-be-laminated tape on upon another;

affixing the preliminary laminating portion of the laminating tape to the leading end of the to-be-laminated tape; and thereafter simultaneously feeding the laminating tape and the to-be-laminated tape to pressure contact means that brings the laminating tape and the to-be-laminated tape into contact under pressure while controlling a lateral position of the laminating tape and a lateral position of the to-be-laminated tape, at least until the non-adhesive portion of the laminating tape has passed through the pressure contact means, to thereby cause a portion of the laminating tape immediately following the non-adhesive portion thereof to be accurately laminated to the to-be-laminated tape.

To attain the fourth object, according to a fourth aspect of the invention, there is provided a laminating device that at least carries out initial lamination of a laminating tape and a to-be-laminated tape having a substantially identical width to a width of the laminating tape by affixing a leading portion of the laminating tape to a leading portion of the to-be-laminated tape, the leading portion of the laminating tape including a preliminary laminating portion formed at a leading end thereof, and a non-adhesive portion extending continuously from a trailing end of the preliminary laminating portion, for permitting lateral motion of the laminating tape with respect to the to-be-laminated tape.

The laminating device according to the fourth aspect of the invention is characterized by comprising:

tape-feeding means for simultaneously feeding the laminating tape and the to-be-laminated tape in a state in which the preliminary laminating portion of the laminating tape has been affixed to the leading portion of the to-be-laminated tape;

pressure contact means for bringing the leading portion of the laminating tape and the leading portion of the to-be-laminated tape into contact under pressure in a manner interlocked with tape-feeding operation of the tape-feeding means; and tape guide means for controlling a lateral position of the laminating tape and a lateral position of the to-be-laminated tape, as the laminating tape and the to-be-laminated tape are simultaneously fed to the pressure contact means by the tape-feeding means.

According to these method and device, the preliminary laminating portion of the laminating tape is affixed to the corresponding portion of the to-be-laminated tape, and then, the two tapes are fed while properly controlling lateral positions thereof to bring them into contact under pressure. This control of the lateral positions of the tapes enables the to-be-laminated tape and the non-adhesive portion of the laminating tape to be guided to a position in which they are properly placed or positioned one upon the other. Thus, the lateral displacement of the two tapes with respect to each other is eliminated before the main laminating portion of the laminating tape extending from the non-adhesive portion thereof starts to be affixed by pressure to the to-be-laminated tape. This makes it possible to affix the two tapes to each other in a state in which they are properly or accurately placed one upon the other.

To attain the third object, according to a fifth aspect of the invention, there is provided a method of laminating a laminating tape having an adhesive layer to a to-be-laminated tape having a substantially identical width. to a width of the laminating tape, the to-be-laminated tape having a preliminary to-be-laminated portion formed at a leading end thereof, for being preliminarily laminated to a leading end of the laminating tape, and an adhesion-refusing portion having a predetermined length and extending continuously from a trailing end of the preliminary to-be-laminated portion, for permitting lateral motion of the to-be-laminated tape with respect to the laminating tape.

The method according to the fifth aspect of the invention is characterized by comprising the steps of:

placing a leading end of the laminating tape and the leading end of the to-be-laminated tape on upon another;

affixing the leading end of the laminating tape to the preliminary to-be-laminated portion of the to-be-laminated tape; and thereafter simultaneously feeding the laminating tape and the to-be-laminated tape to pressure contact means that brings the laminating tape and the to-be-laminated tape into contact under pressure while controlling a lateral position of the laminating tape and a lateral position of the to-be-laminated tape, at least until the adhesion-refusing portion of the to-be-laminated tape has passed through the pressure contact means, to thereby cause the laminating tape to be accurately laminated to a portion of the to-be-laminated tape immediately following the adhesion-refusing portion thereof.

To attain the fourth object, according to a sixth aspect of the invention, there is provided a laminating device that at least carries out initial lamination of a laminating tape and a to-be-laminated tape having a substantially identical width to a width of the laminating tape by affixing a leading portion of the laminating tape to a leading portion of the to-be-laminated tape, the leading portion of the to-be-laminated tape including a preliminary to-be-laminated portion formed at a leading end of the to-be-laminated tape for being preliminarily laminated to a leading end of the leading portion of the laminating tape, and an adhesion-refusing portion having a predetermined length and extending continuously from a trailing end of the preliminary to-be-laminated portion, for permitting lateral motion of the to-be-laminated tape with respect to the laminating tape.

The laminating device according to the sixth aspect of the invention is characterized by comprising:

tape-feeding means for simultaneously feeding the laminating tape and the to-be-laminated tape in a state in which the leading end of the laminating tape has been affixed to the leading end of the to-be-laminated tape;

pressure contact means for bringing the leading portion of the laminating tape and the leading portion of the to-be-laminated tape to contact under pressure in a manner interlocked with tape-feeding operation of the tape-feeding means; and tape guide means for controlling a lateral position of the laminating tape and a lateral position of the to-be-laminated tape, as the laminating tape and the to-be-laminated tape are simultaneously fed to the pressure contact means by the tape-feeding means.

According to these method and device, the preliminary to-be-laminated portion of the to-be-laminated tape is affixed to the leading portion of the laminating tape, and then, the two tapes are fed while properly controlling lateral positions thereof to bring them into contact under pressure. This control of the lateral positions of the tapes enables the adhesion-refusing portion of the to-be-laminated tape and the laminating tape to be guided to a position in which they are properly placed or positioned one upon the other. Thus, the lateral displacement of the two tapes with respect to each other is eliminated before the laminating tape starts to be affixed by pressure to the main to-be-laminated portion of the to-be-laminated tape extending from the adhesion-refusing portion thereof. This makes it possible to affix the two tapes to each other in a state in which they are properly or accurately placed one upon the other.

Preferably, each of the laminating devices is used with a single cartridge containing the laminating tape and the to-be-laminated tape each in the form of a roll.

According to the preferred embodiments, it is easy to incorporate the guide means into the cartridge, and at the same time, it is possible to facilitate handling of the laminating tape and the to-be-laminated tape.

Preferably, each of the laminating devices further includes printing means for printing on a recording surface of the to-be-laminated tape.

Preferably, each of the laminating devices further includes cutter means for cutting off a laminated portion of the laminating tape and the to-be-laminated tape into a strip having a desired length.

According to the preferred embodiments, it is easy to produce a laminated label out of the to-be-laminated tape laminated with the laminating tape.

The above and other objects, features, and advantages of the invention will become more apparent from the following detailed description taken in conjunction with the accompanying drawings.

DETAILED DESCRIPTION

Figure 1:
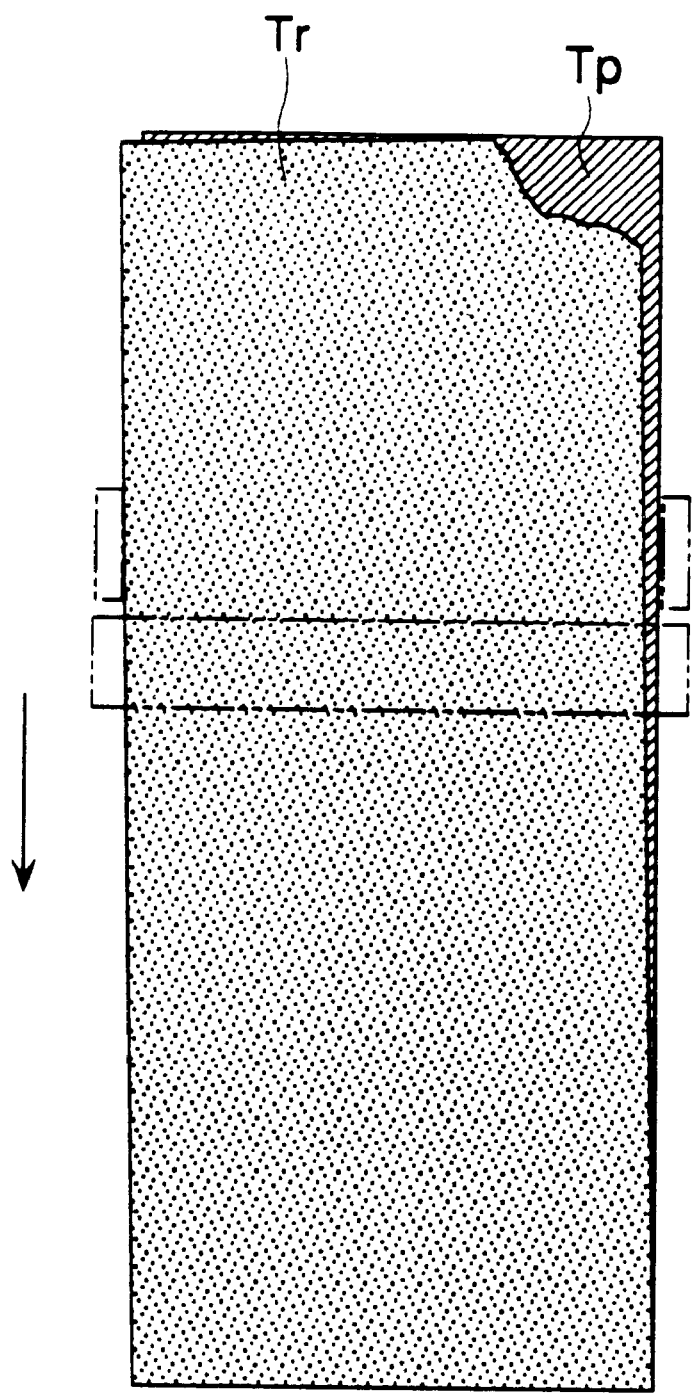
FIG. 1 is a plan view showing a conventional printing tape and a conventional laminating tape, in a laminated state.

The invention will now be described in detail with reference to drawings showing embodiments thereof. In these embodiments, a to-be-laminated tape is a printing tape a front surface of which is used as a recording surface to be printed, while the laminating tape is a tape to be affixed to the front surface of the printing tape so as to protect the printed recording surface of the printing tape. The printing tape and the laminating tape are supplied to a user in a state both contained in an identical i.e. single tape cartridge, and the user mounts this cartridge in a tape printing apparatus before use.

The tape printing apparatus is capable of printing entered desired characters and the like on the printing tape by an ink jet printing method as well as affixing the laminating tape to the printed portion of the printing tape, and thereafter cutting the printing tape and the laminating tape in the laminated state, to thereby produce a laminated label. In a sequence of operations or steps for affixing the laminating tape to the printing tape, the tape printing apparatus carries out printing while feeding the printing tape from the tape cartridge containing a roll of the printing tape, and at the same time unwinds and guides the laminating tape such that the laminating tape meets the printing tape after printing at a confluence as the two tapes are fed. At the confluence, the laminating tape and the printing tape are brought into contact with each other under pressure. Users are supplied with the printing tape and the laminating tape in a state contained in the tape cartridge with leading portions thereof affixed to each other in advance, so as to enable smooth lamination of the tapes. Although the printing tape and the laminating tape are generally fabricated such that they have identical widths, it is preferable to form the laminating tape such that the laminating tape has a slightly smaller width (by approximately 0.3 mm) than the printing tape, in view of laminating accuracy of the apparatus. The laminating tape may be smaller in width than the printing tape to such an extent that the difference can be visually recognized. However, it goes without saying that the laminating tape is required to have a sufficient width to cover all the printed characters and the like.

The leading portions of the printing tape and the laminating tape are required to be affixed to each other with accuracy. Therefore, the initial laminating operation is carried out by the manufacturer as a general rule. However, the tape printing apparatus permits the user to replace the printing tape or the laminating tape contained in the tape cartridge with a new one to save resources. If such replacement is carried out, the user has to affix the leading portions of the two tapes to each other for the initial lamination. For this reason, the two tapes of the embodiments are designed to have inventive features for enabling the user to carry out initial lamination of the tapes with ease and accuracy.

In the following description, to begin with, various embodiments concerning the printing tape and the laminating tape will be described, respectively. Then, brief description will be made of a laminating device for use in the initial lamination, which is used by the manufacturer for affixing the leading portions of the two tapes, and finally, the tape printing apparatus used by the user will be described.

Figure 2:
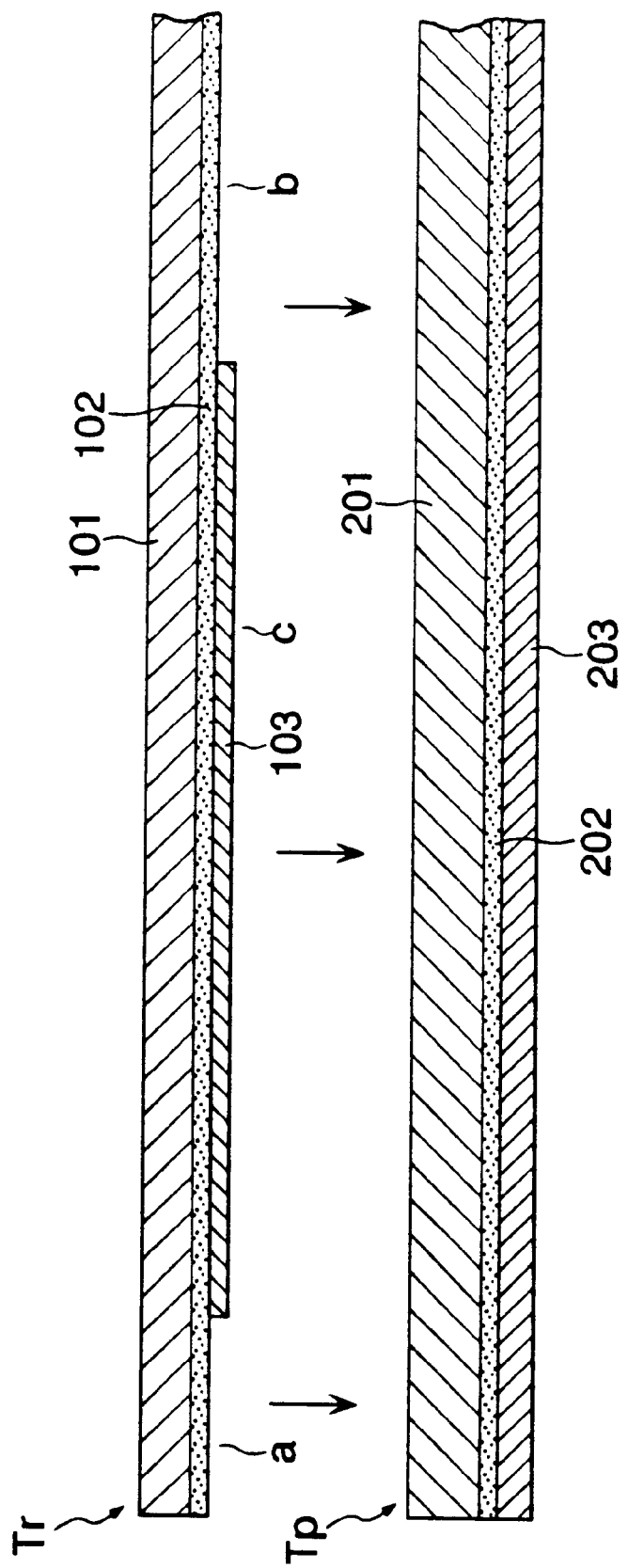
FIG. 2 is an enlarged sectional view showing a leading portion of a printing tape and a leading portion of a laminating tape, according to a first embodiment of the invention.

Referring first to FIG. 2, there are shown leading portions of a printing tape and a laminating tape according to a first embodiment of the invention, on an enlarged scale. As shown in the figure, the laminating tape Tr, which is the upper tape shown in the figure, is comprised of a base laminating tape 101, an adhesive layer 102 coated on a underside surface of the base laminating tape 101, and a mask (tape strip) 103 affixed to the underside surface of the base laminating tape 101. The base laminating tape 101 is formed of an optically transparent film having a thickness of approximately 16 to 38 $\mu$m. It is preferable to use a colorless transparent base laminating tape 101 when color printing is effected on the printing tape Tp. However, a slightly colored base laminating tape may be used when monochrome printing is carried out.

The mask 103 is formed e.g. of a film having a thickness of approximately 16 to 100 $\mu$m. The mask 103 is affixed to the underside surface of the laminating rape Tr between a preliminary laminating portion "a" extending a few centimeters from the leading edge of the tape Tr, and a continuous laminating portion "b" which serves as a main laminating portion of the laminating tape Tr. The preliminary laminating portion "a" and the continuous laminating portion "b" are adhesive portions to be affixed to the printing tape Tp, while the mask 103 forms a non-adhesive portion "c" which cannot adhere to the printing tape Tp. The mask 103 may be either transparent or opaque. However, when an opaque one is used, it is preferred that the mask is different in color from the printing tape Tp such that the non-adhesive portion "c" can be visually and clearly distinguished from the printing tape Tp.

On the other hand, the printing tape Tp, which is the lower tape in FIG. 2, is comprised of a base printing tape 201, an adhesive layer 202 coated on a underside surface of the base printing tape 201, and a release paper tape 203 affixed to the underside surface of the base printing tape 201 via the adhesive layer 202. The base printing tape 201 having the front surface (recording surface) to be printed by an ink jet printing method is formed of a material which is capable of readily absorbing ink. The adhesive layer 202 is used for affixing a laminated label formed by the printing tape Tp and the laminating tape Tr to an object article, while the release paper tape 203 is used for preventing the laminated label from being affixed to any article other than the object article and dust or dirt from depositing on the adhesive layer 202.

To affix the leading portions of the two tapes Tp, Tr formed as described above to each other for initial lamination of the tapes, the preliminary laminating portion "a" of the laminating tape Tr is first affixed to a leading end of the printing tape Tp. Then, alignment of the two tapes Tp, Tr is corrected by the use of the mask 103, i.e. the non-adhesive portion "c" of the laminating tape Tr, and thereafter, a leading end portion of the continuous laminating portion "b" is affixed to the printing tape Tp. Thus, the leading end portion of the continuous laminating portion "b" of the laminating tape Tr can be laminated to the printing tape Tp in a state in which the two tapes Tp, Tr placed one upon the other are accurately aligned, which makes it possible to prevent displacement or jamming of the two tapes Tp, Tr from occurring when the tapes Tp, Tr set in the tape printing apparatus are being used for printing and continuous lamination.

Figure 3:
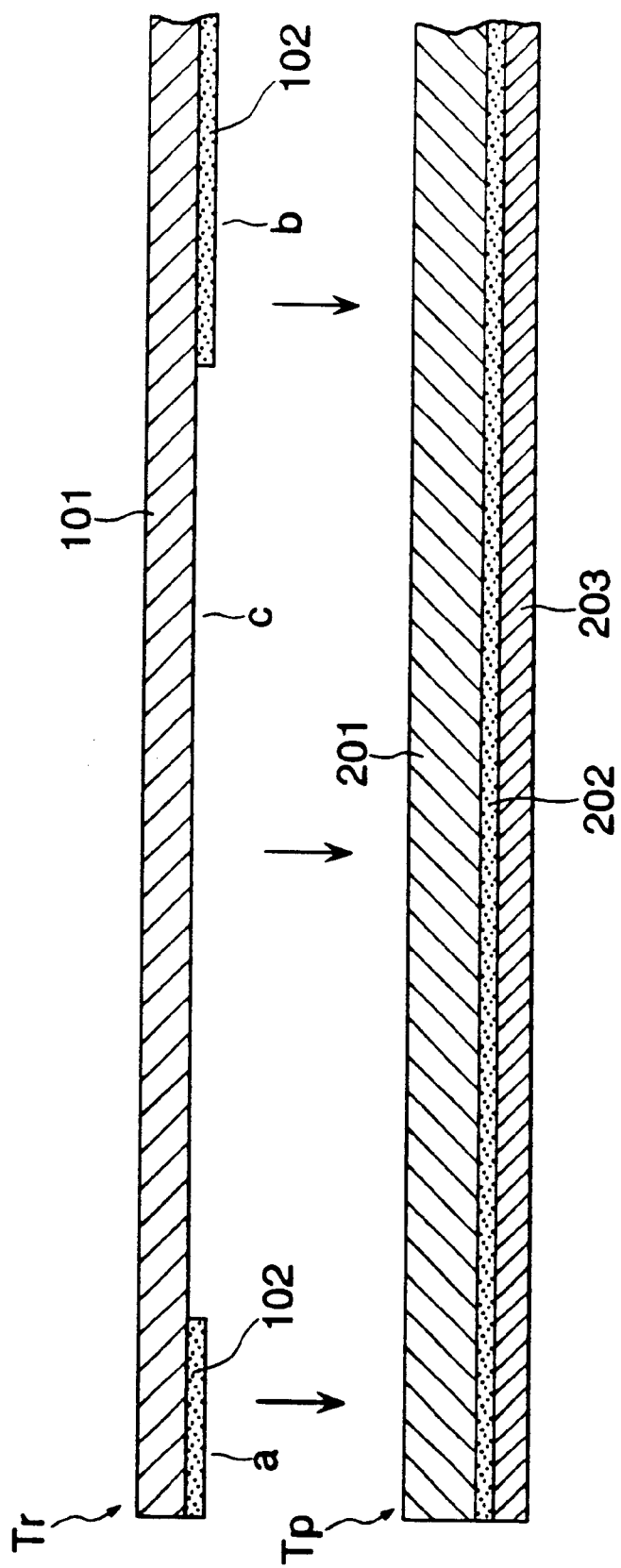
FIG. 3 is an enlarged sectional view showing a leading portion of a printing tape and a leading portion of a laminating tape, according to a second embodiment of the invention.

FIG. 3 shows leading portions of a printing tape and a laminating tape according to a second embodiment of the invention, on an enlarged scale. As shown in the figure, the present embodiment is distinguished from the first embodiment simply in that the laminating tape Tr is different in construction from the one of the first embodiment. More specifically, the laminating tape Tr of the first embodiment has the non-adhesive portion "c" thereof formed by the mask 103, while the laminating tape Tr of the second embodiment has a non-adhesive portion "c" thereof formed by eliminating or omitting one portion of an adhesive layer coated on a underside surface of a base laminating tape Tr. The non-adhesive portion "c" of the laminating tape Tr of the second embodiment is formed by coating an adhesive on the whole underside surface of the base laminating tape 101 except a portion to be used as the non-adhesive portion "c", or by coating the adhesive on the whole underside surface of the base laminating tape 101 and then eliminating the adhesive from the portion to be used as the non-adhesive portion "c" by the use of a solvent or the like. According to this embodiment, it is possible to correct the alignment of the two tapes Tp, Tr by the use of the non-adhesive portion "c" formed as above.

Figure 4:
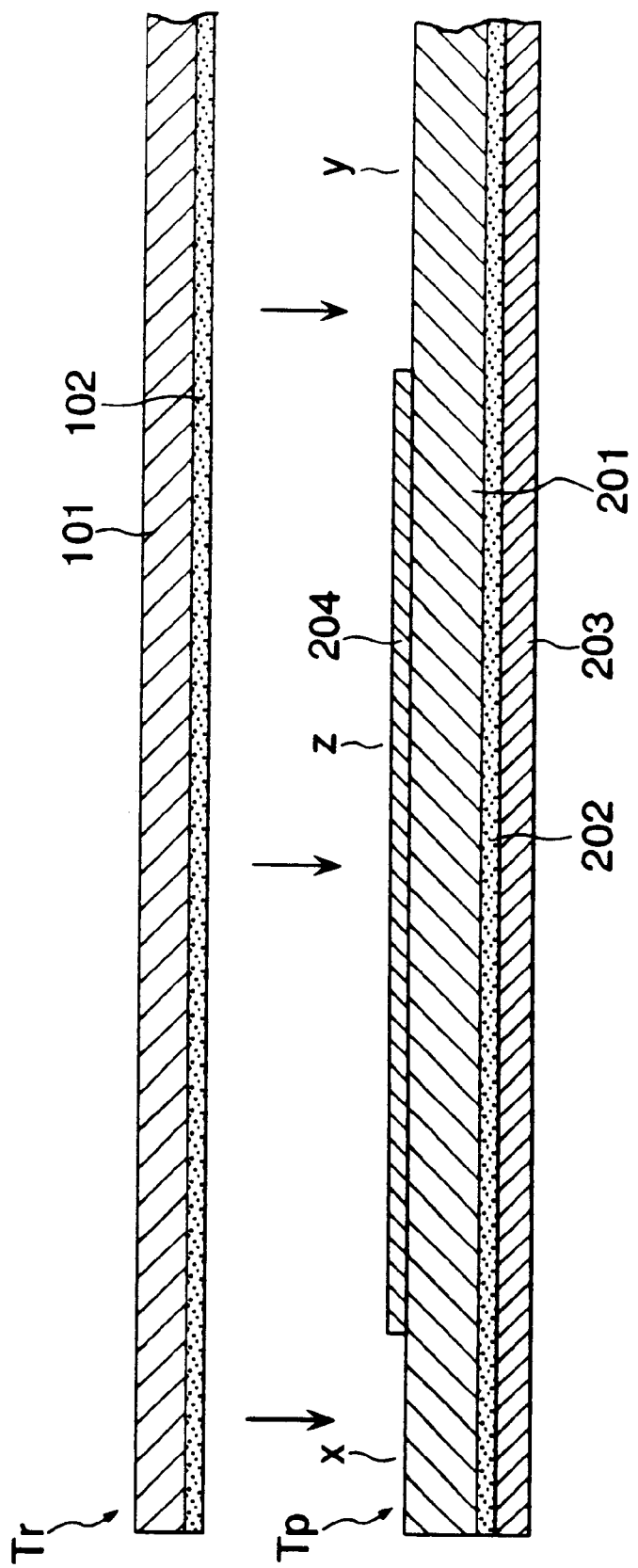
FIG. 4 is an enlarged sectional view showing a leading portion of a printing tape and a leading portion of a laminating tape, according to a third embodiment of the invention.

FIG. 4 shows leading portions of a printing tape and a laminating tape according to a third embodiment of the invention, on an enlarged scale. As shown in the figure, the laminating tape Tr is comprised of a base laminating tape 101 and an adhesive layer 102 alone, while the printing tape Tp is comprised of a base laminating tape 201, an adhesive layer 202, a release paper tape 203, and a non-adhesive coating layer 204. The non-adhesive coating layer 204 is formed on a front surface of the base printing tape 201 between a preliminary to-be-laminated portion "x" extending a few centimeters from the leading edge of the printing tape Tp and a continuous to-be-laminated portion "y" which serves as a main to-be-laminated portion of the printing tape Tp. The non-adhesive coating layer 204 is formed e.g. by a fluorine coating which has the property of being non-adhesive to the adhesive layer 202 of the laminating tape Tr. Therefore, in the present embodiment, the non-adhesive coating layer 204 forms a non-adhesive portion "z" that does not adhere to the laminating Tr, and hence, similarly to the above embodiments, it is possible to correct alignment of the two tapes Tp, Tr by the use of the non-adhesive coating layer 204. Further, similarly to the case of the mask 103 described hereinbefore, it is preferred that the non-adhesive coating layer 204 is different in color from a ground color of the base printing tape 201.

Figure 5:
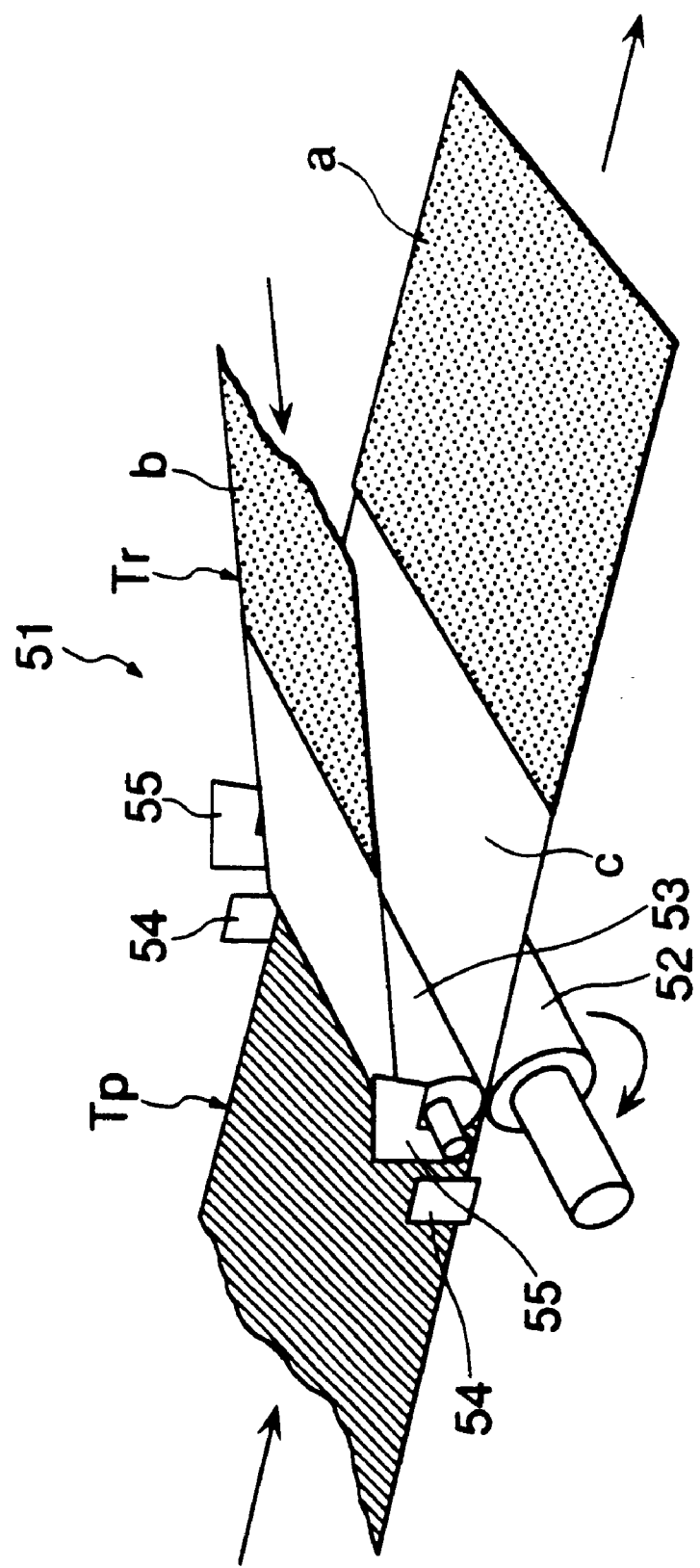
FIG. 5 is a perspective view showing essential elements of a laminating device for use in the initial lamination of the printing tape and the laminating tape, according to an embodiment of the invention, which is also useful in explaining a method of carrying out the initial lamination by using the device.

The leading portions of the printing tape Tp and the laminating tape Tr constructed as above are affixed to each other by the use of a laminating device for the initial lamination, unless the operation is carried out manually. Therefore, the device and the method for initial lamination will be briefly described with reference to FIG. 5, based on an example in which the printing tape Tp and the laminating tape Tr according to the first embodiment of the invention are used.

As shown in the figure, the laminating device 51 includes a drive roller 52 which is driven for rotation via a reduction gear, not shown, by a motor, not shown, a driven roller 53 which rotates in rolling contact with the drive roller 52 as the printing tape Tp and the laminating tape Tr are advanced, and a printing tape guide 54 and a laminating tape guide 55 arranged in the vicinity of the two rollers 52, 53, respectively. The printing tape Tp and the laminating Tr, each of which is initially in a state wound into a roll, not shown, are unwound and guided by the rollers 52, 53, respectively, as illustrated in the figure. The driven roller 53 is urged toward the drive roller 52 by a spring or the like, not shown. It is preferred that at least one of the two rollers 52, 53 is an elastic roller having rubber or the like provided around its body. The drive roller 52 and the driven roller 53 serves not only as pressure contact means for bringing the printing tape Tp and the laminating Tr to contact under pressure, but also as tape-feeding means for feeding the two tapes Tp, Tr simultaneously.

The preliminary laminating portion "a" of the laminating tape Tr and the leading end of the printing tape Tp are manually placed one upon the other and then affixed to each other in advance. The two tapes Tp, Tr in this state are inserted between the two rollers 52, 53. When the drive roller 52 starts rotating, the two tapes Tp, Tr are sent forward while being brought into contact under pressure by the two rollers for lamination, causing rotation of the driven roller 53. The two tapes Tp, Tr are fed according to the rotation of the two rollers 52, 53 for lamination, in a state always guided, respectively, by the two tape guides 54, 55 for preventing the two tapes Tp, Tr from being laterally displaced. That is, the two tape guides 54, 55 guide the printing tape Tp and the laminating tape Tp, respectively, to the two rollers 52, 53 while controlling lateral positions of the two tapes Tp, Tr. When the feeding of the two tapes Tp, Tr proceeds and the non-adhesive portion "c" of the laminating tape Tr reaches the rollers 52, 53, the two tapes Tp, Tr are brought into a feeding state in which lateral motion of each of the two tapes Tp, Tr is permitted by the tape guides 54, 55 since the non-adhesive portion "c" of the laminating tape Tr does not adhere to the printing tape Tp. Therefore, the tapes Tp, Tr have their lateral positions corrected, respectively, by restriction of the tape guides 54, 55 whereby they are advanced in a state accurately aligned one upon the other. When the feeding of the tapes Tp, Tr further proceeds, the continuous adhesive portion "b" of the laminating tape Tr reaches the rollers 52, 53, and a leading end portion of the continuous adhesive portion "b" is affixed to the printing tape Tp.

Figure 6:
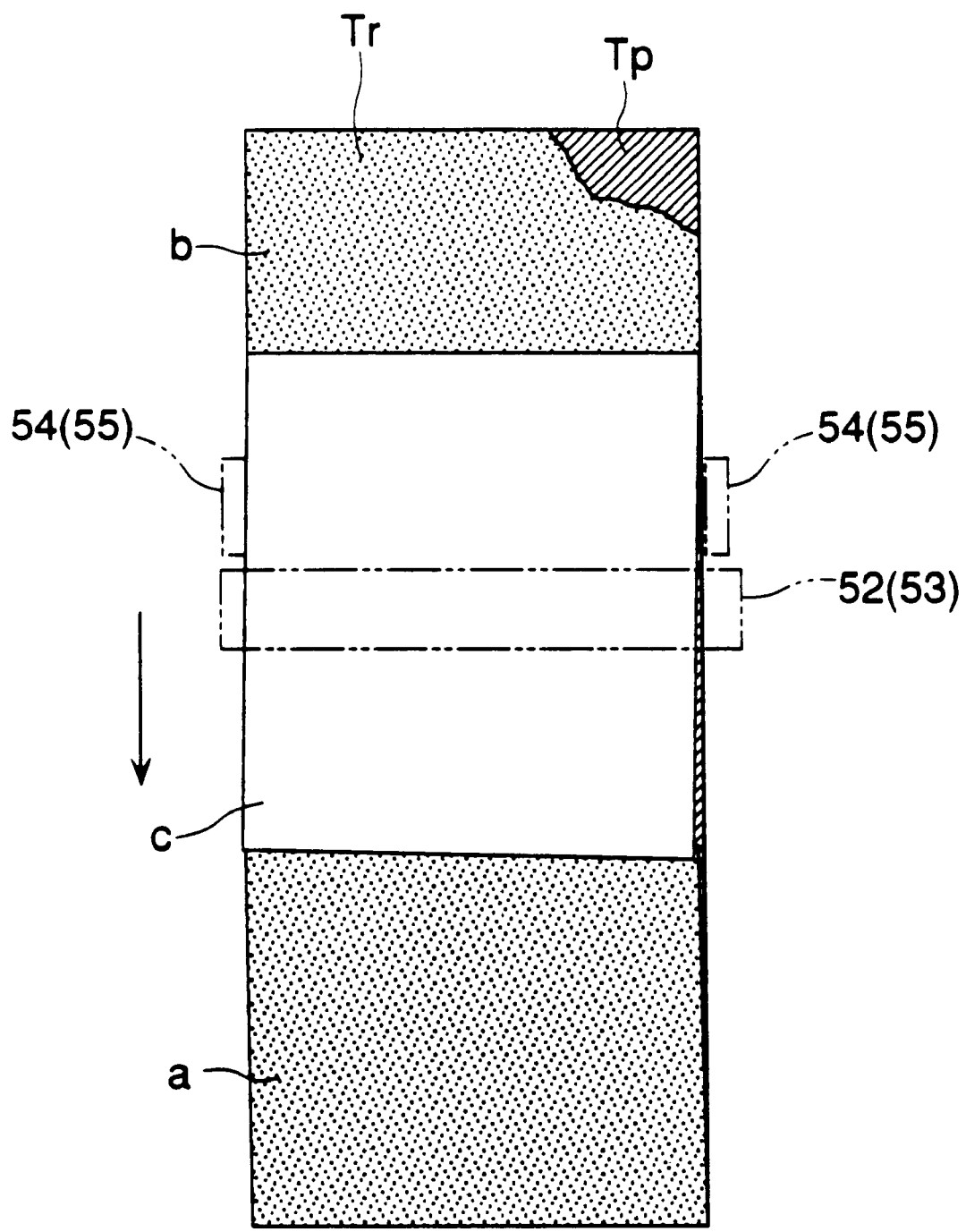
FIG. 6 is a plan view showing the printing tape and the laminating tape according to any of the embodiments of the invention, in a laminated state.

For instance, as shown in FIG. 6, even if the preliminary laminating portion "a" of the laminating tape Tr is angularly displaced with respect to the printing tape Tp, the alignment of the tapes is corrected to eliminate this angular displacement by using the non-adhesive portion "c" extending continuously from the preliminary laminating portion "a", whereby the leading portion of the continuous laminating portion "b" is affixed to the printing tape Tp without displacement. That is, it is possible to carry out accurate initial lamination with ease without any skill, irrespective of laminating accuracy at the preliminary laminating portion "a". of course, the initial lamination of the two tapes Tp, Tr can also be easily and accurately carried out through manual work, without using the device 51 for the initial lamination, and without any skill.

Figure 7:
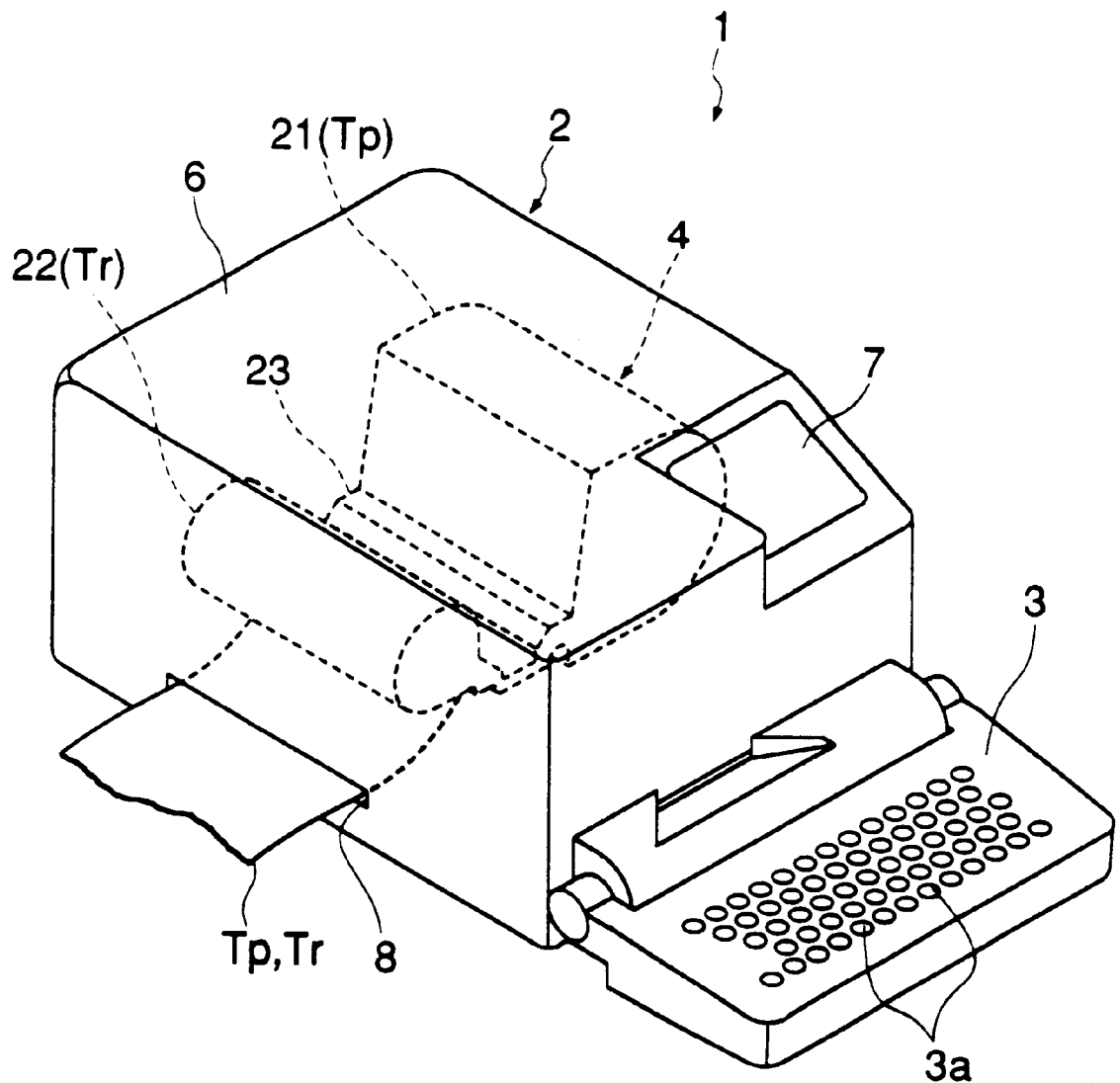
FIG. 7 is a perspective view showing an appearance of a tape printing apparatus according to an embodiment of the invention.
Figure 8:
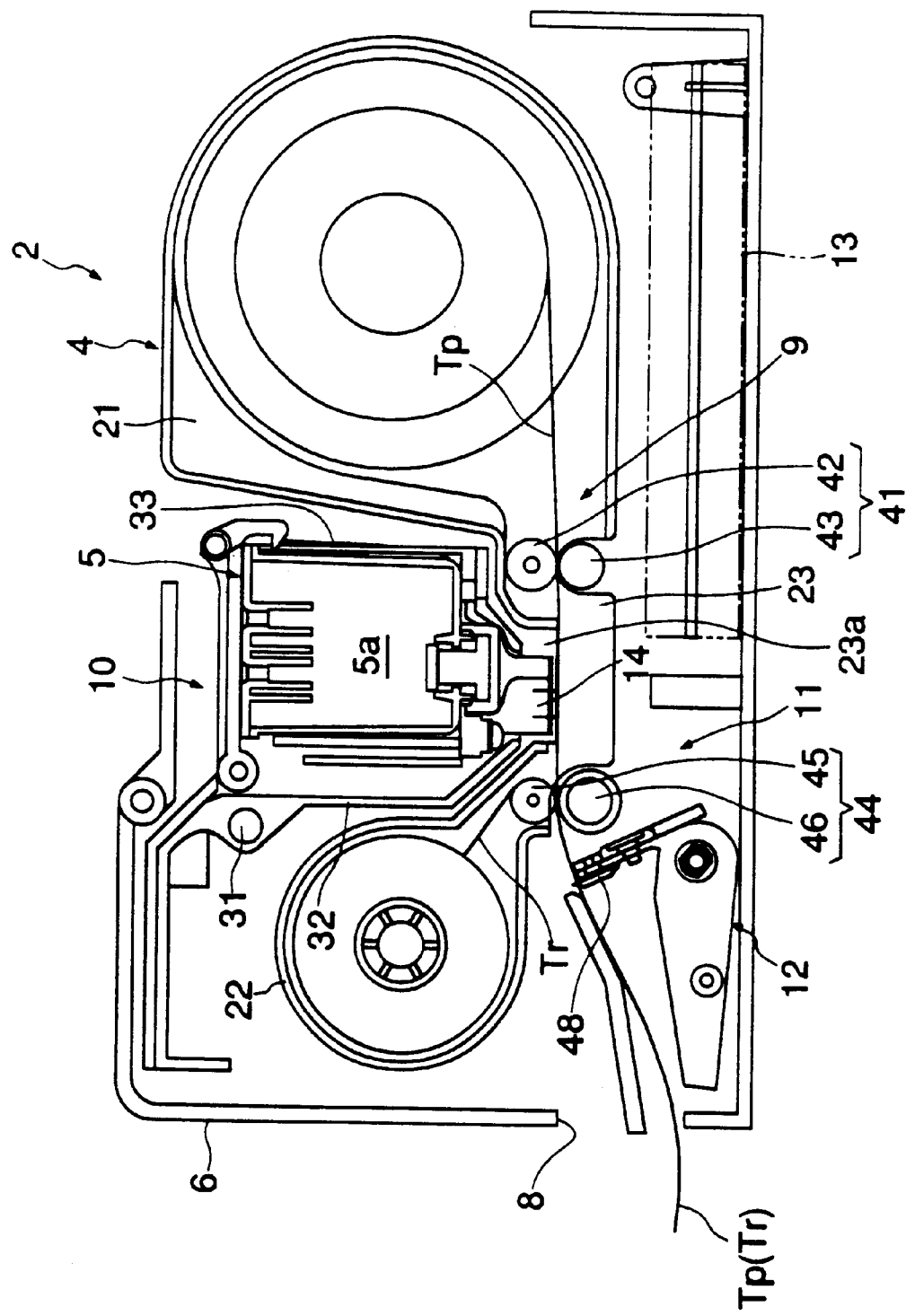
FIG. 8 is a cross-sectional view of the FIG. 7 apparatus.

Next, description will be made of the tape printing apparatus with reference to FIGS. 7 and 8. FIG. 7 shows the appearance of the tape printing apparatus in perspective, while FIG. 8 shows a body of the apparatus in cross section. As shown in the figures, the tape printing apparatus 1 includes the body 2, a keyboard 3 attached to a front portion thereof, a tape cartridge 4 in which the printing tape Tp and the laminating tape Tr are accommodated, and an ink cartridge 5 which contains inks of four colors. The tape cartridge 4 and the ink cartridge 5 are removably mounted in the body 2.

Arranged on a top surface of the keyboard 3 are various keys 3a which form input means of the printing apparatus 1. The keyboard 3 is hinged on a lower portion of a front surface of the body 2 of the tape printing apparatus 1 such that it can be brought into either an upright position or a flat position for use with the body 2. The keyboard 3 is brought to the flat position when the apparatus 1 is in use, while it is held in the upright position, i.e. in a state covering the front surface of the apparatus 1 when the apparatus 1 is carried by the user.

The body 2 of the printing apparatus 1 has a casing 6 having a liquid crystal display 7 arranged at an upper right corner of the front portion thereof as viewed in FIG. 6. The liquid crystal display 7 displays results of inputting and editing of data. Further, the casing 6 has a side face (left side wall as viewed in FIG. 6) formed therethrough with a tape exit 8 in the form of a slit via which laminated printing tape Tp is discharged. The casing 6 has another side wall, not shown, formed with a lidded opening via which the tape cartridge 4 and the ink cartridge 5 are mounted or removed.

Within the casing 6, there are installed a printing tape-feeding mechanism 9 for feeding the printing tape Tp, a printing mechanism 10 for effecting color printing on the printing tape Tp by an ink jet printing method, a tape-laminating mechanism 11 for laminating the laminating tape Tr to the printing tape Tp, a cutting mechanism 12 for cutting laminated printing tape Tp, and a circuit board 13 for controlling operations of these mechanisms as well as processing information (see FIG. 8).

Figure 9:
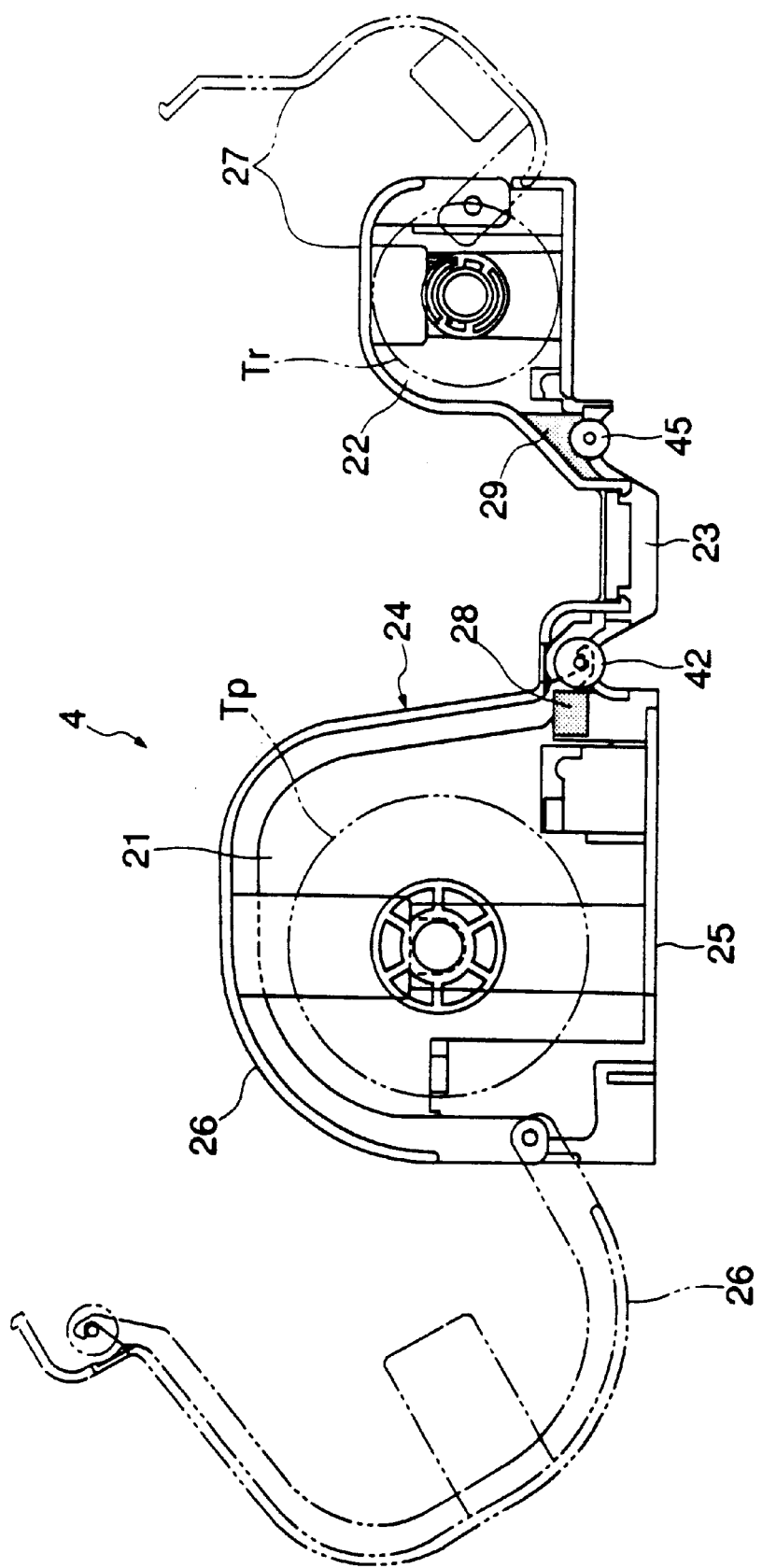
FIG. 9 is a cross-sectional view showing a tape cartridge according to an embodiment of the invention.

As shown in FIGS. 8 and 9, the tape cartridge 4 is constructed in such a manner that a main tape-receiving block 21 in which the printing tape Tp is received and a sub tape-receiving block 22 in which the laminating tape Tr is received are connected by a linkage 23 at an intermediate portion of the cartridge 4, and a print head 14 of the printing mechanism 10 faces the linkage 23. A cartridge case 24 housing the main tape-receiving block 21, the sub tape-receiving block 22, and the linkage 23 is comprised of a base case 25, a main case lid 26 for the main tape-receiving block 21, and a sub case lid 27 for the sub tape-receiving block 22. When the printing tape Tp and/or the laminating tape Tr set within the apparatus body 2 is replaced with a new one, the cartridge 4 containing the tapes Tp, Tr is removed from the apparatus body 2. Then, the main case lid 26 and the sub case lid 27 of the cartridge 4 are opened, so as to remove the printing tape Tp and/or the laminating tape Tr from the cartridge 4 separately, for replacement with the new one.

The printing tape Tp is received in the main tape-receiving block 21 as a roll, while the laminating tape is received in the sub tape-receiving block 22 as a roll. The tapes Tp, Tr are fed from the tape-receiving blocks 21, 22, respectively, and then placed one upon the other to be affixed to each other, followed by being sent out of the tape cartridge 4 via a sub tape-receiving block-side opening of the tape guided cartridge 4. The printing tape Tp fed from the main tape-receiving block 21 has its lateral sides guided by a pair of printing tape guides 28 arranged in the vicinity of a free roller 42, referred to hereinafter, while the laminating tape Tr fed from the sub tape-receiving block 22 has its lateral sides guided by a pair of laminating tape guides 29 arranged in the vicinity of a free roller 45, referred to hereinafter. The two tapes Tp, Tr are guided to laminating roller means 44 by the respective pairs of guides 28, 29. The pair of printing tape guides 28 and the pair of laminating tape guides 29 are arranged such that they are identical in lateral position i.e. position in the direction of the widths of the two tapes Tp, Tr, so that. the tapes Tp, Tr are guided such that they are accurately aligned with respect to the lateral sides thereof.

When the printing tape Tp is advanced by the printing tape-feeding mechanism 9 in the direction of feed, desired printing is effected on the printing tape Tp by the printing mechanism 10 arranged in a manner opposed to the linkage 23. Then, the laminating tape Tr fed from the sub tape-receiving block 22 is affixed to the printed portion of the printing tape Tp by the tape-laminating mechanism 11 in such a manner that the former is laminated to the latter. The printing tape Tp having the laminating tape Tr laminated to the printed portion thereof is discharged via the tape exit 8 by cooperation of the printing tape-feeding mechanism 9 and the tape-laminating mechanism 11. When a trailing end of the printed portion of the printing tape including a margin reaches a cutting position, the printing tape-feeding mechanism 9 and the tape-laminating mechanism 11 stops the feeding of the printing tape Tp, and the cutting mechanism 12 operates to cut off the printed portion of the printing tape Tp having the laminating tape Tr laminated thereto.

The printing mechanism 10 includes a carriage guide shaft 31 having longitudinal opposite ends (opposite ends of the shaft 31 extending in a direction perpendicular to the sheet surface of FIG. 8) supported by a frame, not shown, a carriage 32 slidably mounted on the carriage shaft 31, a timing belt, not shown, traveling in normal and reverse directions for reciprocating the carriage 32 rightward and leftward, and a carriage motor, not shown, causing the timing belt to travel in the normal and reverse directions. The print head 14 and a cartridge holder 33 for holding the ink cartridge 5 are mounted at lower and upper portions of the carriage 32, respectively, in a manner forming a unit. The print head 14 faces downward, and the ink cartridge 5 is mounted within the cartridge holder 33 such that it has its delivery port directed downward. When the ink cartridge 5 is mounted, ink reservoirs 5a thereof, each of which contains ink of a different color, communicates with the print head 14 for supply of ink. The ink reservoirs 5a contain yellow ink, cyan ink, magenta ink, and black ink, respectively.

The printing tape-feeding mechanism 9 includes feed roller means 41 comprised of the free roller 42 positioned above and a drive roller 43 positioned below, and a feed motor, not shown, for driving the drive roller 43 for rotation. The drive roller 43 is arranged in the body 2 of the printing apparatus 1, while the free roller 42 is arranged in the tape cartridge 4. When the tape cartridge 4 is mounted in the body 2, the free roller 42 presses the printing tape Tp in a manner sandwiching the tape Tp between the drive roller 43 and the free roller 42 itself. The printing tape Tp is advanced in this state as the feed motor rotates. The relationship between the feeding of the printing tape Tp and reciprocation of the printing head 14 corresponds to the relationship between a main scanning direction and a sub scanning direction in the printing technique. Therefore, the feed motor operates in a manner interlocked with operation of the carriage motor.

The tape-laminating mechanism 11 includes the laminating roller means 44 comprised of the free roller 45 positioned above and a drive roller 46 positioned below, and a laminating motor, not shown, for driving the drive roller 46 for rotation. The laminating motor and the feed motor are implemented by an identical or single motor, torque of which is split via a reduction gear train to be transmitted to the feed roller means 41 and the laminating roller means 44, respectively. The drive roller 46 is arranged in the body 2 of the tape printing apparatus 1, while the free roller 45 is arranged in the tape cartridge 4. The drive roller 46 is an elastic roller having a peripheral surface thereof covered with an elastic material such as rubber, which enables proper lamination of the printing tape Tp and the laminating tape Tr.

When the tape cartridge 4 is mounted in the apparatus body 2, the free roller 45 presses the printing tape Tp and the laminating tape Tr in a manner sandwiching the tapes Tp, Tr between the drive roller 46 and the free roller 45 itself. The printing tape Tp and the laminating tape Tr are affixed to each other in this state and advanced as the laminating motor rotates. In the course of the feeding by the laminating motor, the printing tape Tp is guided by the pair of printing tape guides 28 to the laminating roller means 44, while the laminating tape Tr is guided by the pair of laminating tape guides 29 to the same roller means 44.

The feed roller means 41 and the laminating roller means 44 are arranged on an identical horizontal plane such that the printing tape Tp can be fed horizontally between the two roller means 41 and 44. Further, the two roller means 41, 44 are designed such that the circumferential speed of the laminating roller means 44 is slightly faster than that of the feed roller means 41, so as to provide tension of the printing tape therebetween. The linkage 23 of the tape cartridge 4 located between the feed roller means 41 and the laminating roller means 44 is formed with an opening 23a via which the print head 14 faces the printing tape Tp.

The cutting mechanism 12 includes a cutter 48 and a cutter motor, not shown, for driving the cutter 48 for cutting operation. After the printing is completed, when the feed motor (laminating motor) feeds the printing tape Tp by a predetermined number of steps, the motor is stopped, and at the same time, the cutter motor starts driving the cutter 48 for cutting the printing tape Tp. The cutter 48 may be manually operated by key stroke, for the cutting of the tape Tp. There are provided a various kinds (approximately ten kinds) of the printing tape Tp and the laminating tape Tr, which are different in width (approximately 4.5 to 96 mm). The tapes Tp, Tr of these kinds are each supplied in a state contained in the tape cartridge 4.

As described above, the printing tape Tp and the laminating tape Tr are supplied to the user in the state contained in the tape cartridge 4 with the leading portions thereof affixed to each other. The two tapes supplied to the user can be removed from the cartridge 4 after opening the case lids 26, 27, respectively, for replacement with new ones. However, when the printing tape Tp and/or the laminating tape Tr is replaced, it is required that the user himself affix the leading portions of the two tapes Tp, Tr to each other for the initial lamination of the tape. Therefore, next, the method of carrying out initial lamination of the two tapes Tp, Tr by the use of the above tape printing apparatus 1 will be described based on an example in which the printing tape Tp and the laminating tape Tr according to the first embodiment of the invention are used.

First, the tape cartridge 4 is removed from the body 2 of the printing apparatus 1. Then, a new printing tape Tp and/or a new laminating tape Tr is mounted in the cartridge case 24, with the leading portions of the tape; Tp, Tr pulled out. Next, the preliminary laminating portion "a" of the laminating tape Tr is positioned or placed on the leading portion of the printing tape Tp, and a affixed thereto. Then, the tape cartridge 4 is mounted in the apparatus body 2 in this state, and the feed roller means 41 and the laminating roller means 44 are rotated by key stroke to feed the two tapes Tp, Tr. The tapes Tp, Tr are advanced, respectively, to the laminating roller means 44 for lamination in a state always guided by the two pairs of tape guides 28, 29 with respect to the lateral sides thereof, respectively. In the course of the lamination, immediately before the non-adhesive portion "c" of the laminating tape Tr reaches the laminating roller means 44, the two tapes Tp, Tr have their lateral positions corrected by the two pairs of tape guides 28, 29 guiding the lateral sides thereof, whereby they are advanced while being laminated in an accurately aligned state. When the leading end of the continuous laminating portion "b" of the laminating tape Tr reaches the cutter 48, the feeding of the two tapes is stopped, and then the cutting mechanism is driven by key stroke to cut off the tapes Tp, Tr.

Also, in this case, even if the preliminary laminating portion "a" of the laminating tape Tr manually affixed to the printing tape Tp is angularly displaced with respect to the printing tape Tp, the alignment of the tapes is corrected by the use of the non-adhesive portion "c" extending continuously from the preliminary laminating portion "a", which makes it possible to affix the continuous laminating portion "b" of the laminating tape Tr to the printing tape Tp without any displacement from the start. Thus, the initial lamination of the printing tape Tp and the laminating tape Tr can be easily and accurately carried out without any skill, irrespective of laminating accuracy at the preliminary laminating portion "a".

It is further understood by those skilled in the art that the foregoing are preferred embodiments of the invention, and that various changes and modification may be made without departing from the spirit and scope thereof.

What is claimed is:

1. A laminating device that at least carries out initial lamination of a laminating tape and a to-be-laminated tape, the laminating device comprising:

a laminating tape having a width, a leading portion which includes a preliminary laminating portion formed at a leading end thereof, and a non-adhesive portion extending continuously from a trailing end of said preliminary laminating portion for permitting lateral motion of said laminating tape with respect to a to-be-laminated tape;

a to-be-laminated tape having a substantially identical width to said width of said laminating tape and having a leading portion;

tape-feeding means for simultaneously feeding said laminating tape and said to-be-laminated tape in a state in which said preliminary laminating portion of said laminating tape has been affixed to said leading portion of said to-be-laminated tape;

pressure contact means for bringing said leading portion of said laminating tape and said leading portion of said to-be-laminated tape into contact under pressure in a manner interlocked with tape-feeding operation of said tape-feeding means; and tape guide means for controlling a lateral position of said laminating tape and a lateral position of said to-be-laminated-tape, as said laminating tape and said to-be-laminated tape are simultaneously fed to said pressure contact means by said tape-feeding means;

said laminating tape and said to-be-laminated tape being laminated together across the entirety of said leading ends of each to bond said laminating tape and said to-be-laminated tape together with said leading ends of each in alignment.

2. A laminating device according to claim 1, wherein said laminating device is used with a single cartridge containing said laminating tape and said to-be-laminated tape each in the form of a roll.

3. A laminating device according to claim 1, further including printing means for printing on a recording surface of said to-be-laminated tape.

4. A laminating device according to claim 1, further including cutter means for cutting off a laminated portion of said laminating tape and said to-be-laminated tape into a strip having a desired length.

5. A laminating device that at least carries out initial lamination of a laminating tape and a to-be-laminated tape, the laminating device comprising:

a laminating tape having a width and a leading portion having a leading end;

a to-be-laminated tape having a substantially identical width to said width of said laminating tape, and having a leading portion formed at a leading end thereof and including a preliminary to-be-laminated portion formed at said leading end of said to-be-laminated tape for being preliminary laminated to said leading end of said leading portion of said laminating tape, and an adhesion-refusing portion having a predetermined length and extending continuously from a trailing end of said preliminary to-be-laminated portion, for permitting lateral motion of said to-be-laminated tape with respect to said laminating tape;

tape-feeding means for simultaneously feeding said laminating tape and said to-be-laminated tape in a state in which said leading end of said laminating tape has been affixed to said leading end of said to-be-laminated tape;

pressure contact means for bringing said leading portion of said laminating tape and said leading portion of said to-be-laminated tape to contact under pressure in a manner interlocked with tape-feeding operation of said tape-feeding means; and tape guide means for controlling a lateralm position of said laminating tape and a lateral position of said to-be-laminated tape, as said laminating tape and said to-be-laminated tape are simultaneously fed to said pressure contact means by said tape-feeding means;

said laminating tape and said to-be-laminated tape being laminated together across the entirety of said leading ends of each to bond to said laminating tape and said to-be-laminated tape together with said leading ends of each in alignment.

6. A laminating device according to claim 5, wherein said laminating device is used with a single cartridge containing said laminating tape and said to-be-laminated tape each in the form of a roll.

7. A laminating device according to claim 5, further including printing means for printing on a recording surface of said to-be-laminated tape.

8. A laminating device according to claim 5, further including cutter means for cutting off a laminated portion of said laminating tape and said to-be-laminated tape into a strip having a desired length.

* * * * *